Feb. 20, 1934.   L. C. HYATT   1,947,716
CAR HEATING AND VENTILATING SYSTEM
Filed March 2, 1928   2 Sheets-Sheet 1
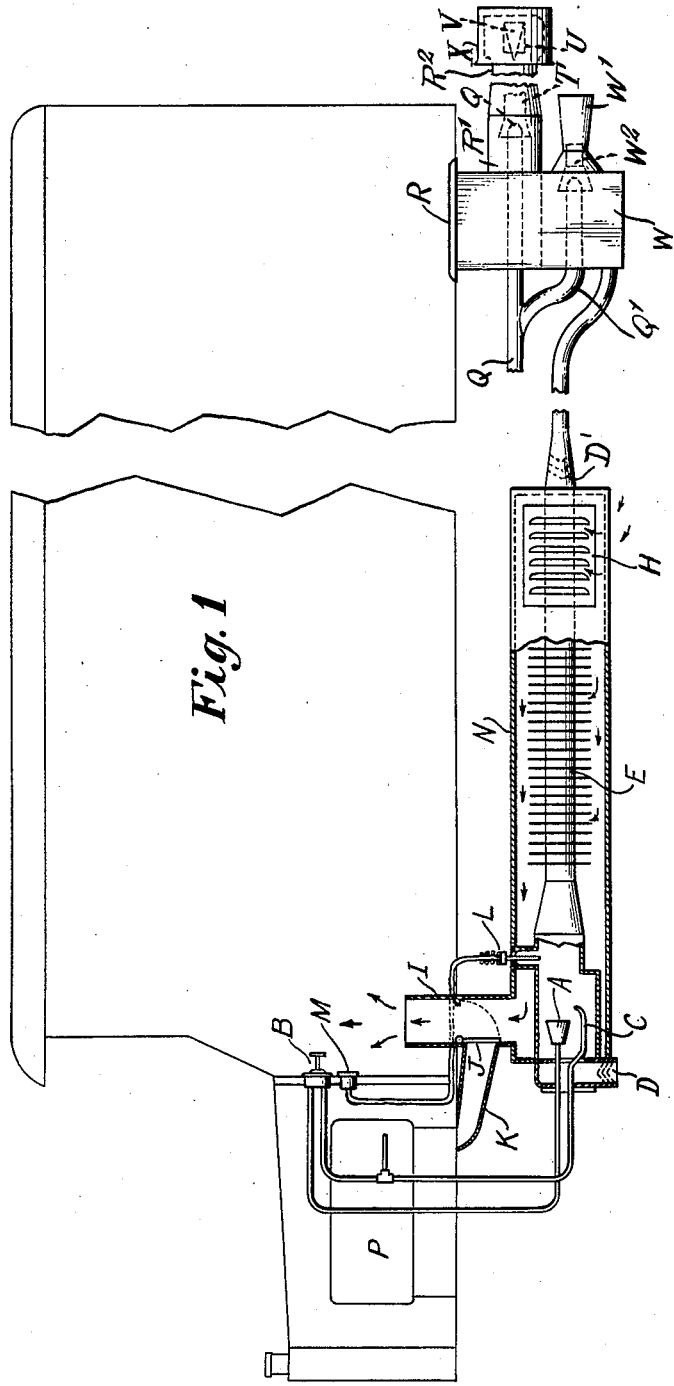
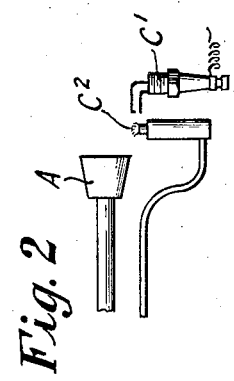
Inventor
LOUIS C. HYATT

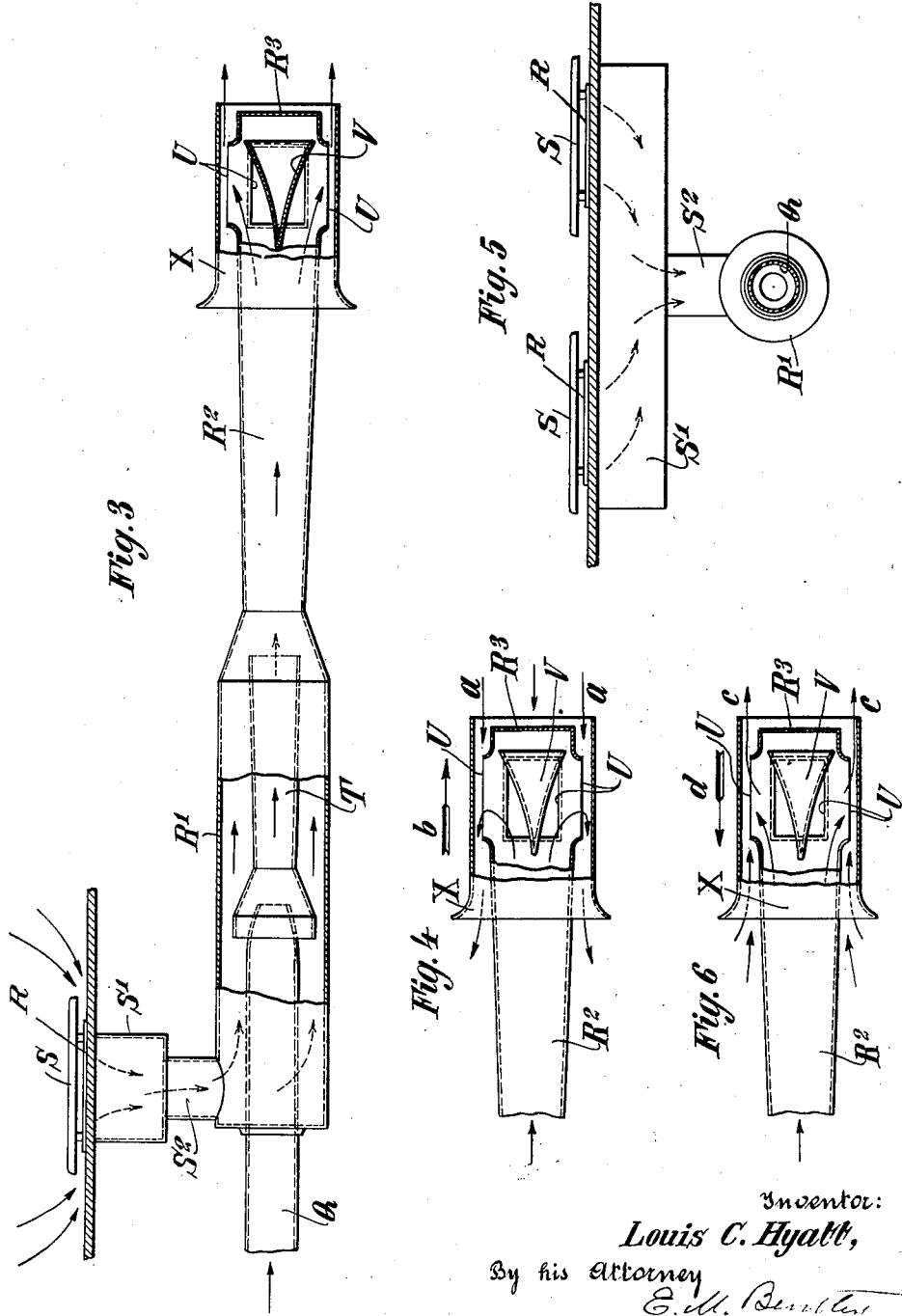

Patented Feb. 20, 1934

1,947,716

UNITED STATES PATENT OFFICE 1,947,716

CAR-HEATING AND VENTILATING SYSTEM

Louis C. Hyatt, Albany, N. Y., assignor to Consolidated Car-Heating Company, Inc., Albany, N. Y., a corporation of New York Application March 2, 1928. Serial No. 258,591

10 Claims. (Cl. 98—2)

For a detailed description of the present form of my invention, reference may be had to the following specification and to the accompanying drawings forming a part thereof, wherein Fig. 1 shows my system diagrammatically;

Fig. 2 shows a slightly modified ignition device. Figure 3 is a side elevation partly in section illustrating the practical details of the suction ventilator which is diagrammatically illustrated in Figure 1, and which, for convenience, I designate as a venturilator. Figures 4 and 6 are similar detail sectional views illustrating the methods of insuring discharge of exhaust gases into the atmosphere irrespective of atmospheric air current conditions or direction of travel of the vehicle. Figure 5 is a transverse sectional view of the device illustrated in Figure 3.

My invention involves a system of heating and ventilating cars and passenger-carrying vehicles. It is now recognized that the problem of ventilating such vehicles is dependent on the mode of heating them. It is also a matter of increasing importance which is coming to engage the attention of Government authorities who are imposing strict rules therefor. It is also recognized that haphazard ventilation by open windows and so-called ventilators in the roof or side walls is unsatisfactory for many reasons, chiefly because they bring in air which is not heated and vastly more of it when the car is moving than when standing still. Moreover the attempts to introduce fresh air by means of fans and blowers involves the employment of special mechanism with moving parts which is also objectionable.

The purpose of my present invention is to provide a system wherein a fully adequate amount of fresh, heated air will be supplied independently of the progress of the car, being particularly adapted for cars propelled by gas engines which are clutched to the car axles and when unclutched continue, or may be made to continue, running during a large part of the time when the car itself is standing still, as in the case of the automobile bus which is shown in the drawings.

My invention is based on the discovery of an unexpected suction capacity far beyond that ordinarily attributed by engineers to a Venturi tube in the exhaust diluter and distributer which forms the subject of my pending application for patent Serial No. 199,770, filed June 18, 1927. I am now able to utilize the said diluter, not only for the purpose of rendering innocuous the exhaust gas from the engine, as described in my application aforesaid, but also as a ventilating agency which has no moving parts and is independent of the progress of the vehicle.

In the drawings an oil-burning heater is shown extended longitudinally beneath the body of the vehicle. This comprises a heater-flue E having radiating ribs with a combustion chamber at its left hand end, both enclosed by a heat-insulating casing N having a louvered window H. This casing N has an upward extension I controlled by a damper J passing into the body of the car through which extension the heated fresh air is introduced, so that a large current of heated air, at low velocity is supplied to the interior of the vehicle. There is also a diagonal flue K, leading to the engine compartment P. At L is a thermo-couple, projected through casing N and into the burner, with its wires leading up to the indicator M, supported at any desired position, preferably upon the usual instrument board which is standard equipment on most motor vehicles. The burner is indicated at A with the fuel pipe controlled by valve B on said instrument board, and a pilot burner C for igniting said burner A. In lieu of the pilot burner I may employ for this purpose a wick $C^2$ in the fuel-tube terminal and a spark-plug $C^1$ to ignite it as indicated in Fig. 2. The air supply for the burner is derived from the compartment at the left end of the combustion chamber, the said chamber being provided at D with an air-admission opening covered with a triple Davy screen to arrest any back flame. At the right the aforesaid flue E may be continued into a chimney or waste-products pipe but I prefer to connect it to a small suction device W similar in principle to that which I employ for the car ventilation. The device W is worked by a branch from the engine exhaust pipe Q.

In the floor of the car is an opening R which leads to the chamber of my aforesaid diluter, said chamber being diagrammatically illustrated at R'. The exhaust pipe Q of the propelling gas engine extends into this chamber $R^1$ and acts to exert a suction through the car opening R. This I have found adequate to draw 10,000 cubic feet of air per hour through the opening R when said opening is three inches in diameter. This indicates the adequacy of my system for car ventilation since that amount of air would alone supply ten persons with 1,000 cubic feet of air per hour. This, with the additional air produced by the convection heat of the burner and introduced through extension I, will be sufficient for car ventilation, while it may be increased if necessary. The figure of 1,000 cubic feet per person per hour is greater than has yet been specified for car heating by civic authorities but it may be anticipated as a standard requirement in the near future. Even if a larger figure should be required, my system will be able to meet it. The principle of my device is that the column of exhaust gas has a high velocity with comparatively small volume, the suction-energy of which is exercised to produce a ventilating air current having a relatively much larger volume but of much lower velocity. The application of this principle to provide a static ventilator for cars which will meet the maximum requirement is, so far as I am aware, my own invention.

The said exhaust pipe Q, as shown in Figs. 3-5, enters the rear end of a chamber R¹, constructed in the form of a larger tube, which constitutes the body of the venturilator. The slightly contracted end of the pipe Q enters the enlarged rear end of an internal nozzle T whose forward end is gradually enlarged and delivers its gaseous contents into the smaller extension R² of body R¹, the suction effect of the venturilator being magnified. The outer end of said extension R² is closed by a cap R³ but has lateral outlet openings U, U, on opposite sides near its end. Outside of the extension R² and spaced therefrom is a sleeve X open at both ends and slightly enlarged at its rear end. V is the conical disburser which points into extension R² but is spaced therefrom. Within the body of the car are two floor-plates S, S which are slightly raised above the floor level so that air may be sucked in under them around their edges through openings R. The space under each of the said floor-plates communicates with a chest S¹ under the floor which is centrally connected, by a short pipe S² with the rear end of the venturilator-body R¹. By this means it becomes impossible for the exhaust gases to be blown back into the interior of the car body either by a strong wind blowing against the exhaust, or by the vehicle backing up into a wind. Otherwise it might happen under such circumstances that the exhaust gases would be forced backward in the venturilator and thence into the interior of the car. Thus, as shown in Fig. 4, a wind, blowing in the direction of arrows a, a, or caused by motion of the vehicle in the opposite direction, as indicated by the arrow b, would merely cause the outflow from extension R², which, after its emergence from R², would normally follow the direction of the arrows shown in Fig. 3 to be turned backwards, as shown in Fig. 4, and pass out of sleeve X into the atmosphere at the reverse end of the sleeve. In case an opposite wind in the direction of arrows c, c, etc., in Fig. 6, or in case of an opposite movement of the vehicle, indicated by arrow d, the effect would merely supplement the normal effect shown in Fig. 3. In any event, as experience has demonstrated, while the engine-exhaust, acting through the venturilator, will effectively withdraw vitiated air from the car body, and also draw into it fresh heated air, yet it will not admit thereto the exhaust gases. This provides all the factors required for both ventilation and heating without resort to blowers or other moving parts.

What I claim as new and desire to secure by Letters Patent is:

1. A ventilating apparatus of the character described comprising a chamber having means for communication with the space to be ventilated, means for causing a high velocity small fluid current to pass through said chamber so as to induce an air current of low velocity to travel through said chamber, a discharge pipe for said air current, an air current dispersing member positioned within the discharge end of said discharge pipe so as to divert said air current radially from its axial line of travel as it is delivered to the atmosphere, and means for discharging the diverted air current into the atmosphere in either of two directions.

2. A ventilating apparatus of the character described comprising a chamber having means for communication with the space to be ventilated, means for causing a high velocity small fluid current to pass through said chamber so as to induce an air current of low velocity to travel through said chamber, a discharge pipe for said air current, an air current dispersing member positioned within the discharge end of said discharge pipe so as to divert said air current from its axial line of travel as it is delivered to the atmosphere, and a sleeve enclosing the outlet end of said discharge pipe and spaced therefrom, said sleeve being open to the atmosphere at both ends.

3. A ventilating apparatus of the character described comprising a chamber having means for communication with the space to be ventilated, means for causing a high velocity small fluid current to pass through said chamber so as to induce an air current of low velocity to travel through said chamber, a discharge pipe for said air current, the delivery end of said discharge pipe having peripheral openings formed therein, means positioned within said delivery end adjacent to said openings for diverting said air current from its axial line of travel as it is delivered into the atmosphere, and means for discharging the diverted air current into the atmosphere in either of two directions.

4. A ventilating apparatus of the character described comprising a chamber having means for communication with the space to be ventilated, means for causing a high velocity small fluid current to pass through said chamber so as to induce an air current of low velocity to travel through said chamber, a discharge pipe for said air current, the delivery end of said discharge pipe having peripheral openings formed therein, means positioned within said delivery end adjacent to said openings for diverting said air current from its axial line of travel as it is delivered into the atmosphere, and a concentrically disposed sleeve enclosing the delivery end of said discharge pipe and spaced therefrom, said sleeve being open to the atmosphere at both ends.

5. A ventilating apparatus of the character described comprising a chamber having means for communication with the space to be ventilated, means for causing a high velocity small fluid current to pass through said chamber so as to induce an air current of low velocity to travel through said chamber, a discharge pipe for said air current, a centrally disposed conical member located within the delivery end of said discharge pipe with its apex extending forwardly, so as to divert said air current from its axial line of travel as it is delivered to the atmosphere, and means for discharging the diverted air current into the atmosphere in either of two directions.

6. A ventilating apparatus of the character described comprising a chamber having means for communication with the space to be ventilated, a Venturi nozzle, a supply pipe having its discharge end extended into said nozzle so that an air current is induced to travel through said chamber, a discharge pipe for said air current, means within the delivery end of said discharge pipe for diverting the air current from its axial line of travel through said pipe as it is delivered to the atmosphere, and means for directing the diverted air current to the atmosphere in either of two directions.

7. A ventilating apparatus of the character described comprising a chamber having means for communication with the space to be ventilated, a Venturi nozzle, a supply pipe having its discharge end extended into said nozzle so that an air current is induced to travel through said chamber, a discharge pipe for said air current, the delivery end of said discharge pipe having peripheral openings formed therein, means within the delivery end of said discharge pipe for diverting said air current outwardly through said openings, and means for directing the diverted air current into the atmosphere in either of two directions.

8. A ventilating apparatus of the character described comprising a chamber having means for communication with the space to be ventilated, a Venturi nozzle, a supply pipe having its discharge end extended into said nozzle so that an air current is induced to travel through said chamber, a discharge pipe for said air current, the delivery end of said discharge pipe having peripheral openings formed therein, means within the delivery end of said discharge pipe for diverting said air current outwardly through said openings, and an annularly disposed sleeve enclosing said discharge end and spaced therefrom, said sleeve being open to the atmosphere at both ends.

9. A ventilating apparatus of the character described comprising a chamber having means for communication with the space to be ventilated, a discharge pipe leading from said chamber, said discharge pipe being of gradually increasing diameter from its inlet end to its delivery end, the delivery end of said discharge pipe having peripheral outlet openings, means for inducing an air current to travel through said chamber and said discharge pipe, means within the delivery end of said discharge pipe for diverting said air current outwardly through said openings, and means for directing the diverted air current into the atmosphere in either of two directions.

10. A ventilating apparatus of the character described comprising an exhausting chamber having means for communication with the space to be ventilated, means for causing a high velocity small fluid current to pass through said chamber so as to induce an air current of low velocity to travel through the chamber, a discharge pipe for said air current, an air current dispersing member positioned within the discharge end of said discharge pipe so as to divert said air current radially from its axial line of travel as it is delivered to the atmosphere, means for discharging the diverted air current into the atmosphere in either of two directions, a second exhaust chamber, a heating chamber having means for communication with the space to be ventilated, a discharge pipe for the products of combustion connecting the heating chamber with the last mentioned exhausting chamber, and means associated with the first mentioned air current inducing means constructed and arranged to induce an air current of low velocity to travel through the discharge pipe of the heating chamber to effect delivery of the contents of the second exhaust chamber to the atmosphere.

LOUIS C. HYATT.